No. 823,497. PATENTED JUNE 19, 1906.
L. ALARME.
ANTISLIPPING DEVICE FOR HORSESHOES.
APPLICATION FILED APR. 2, 1904.
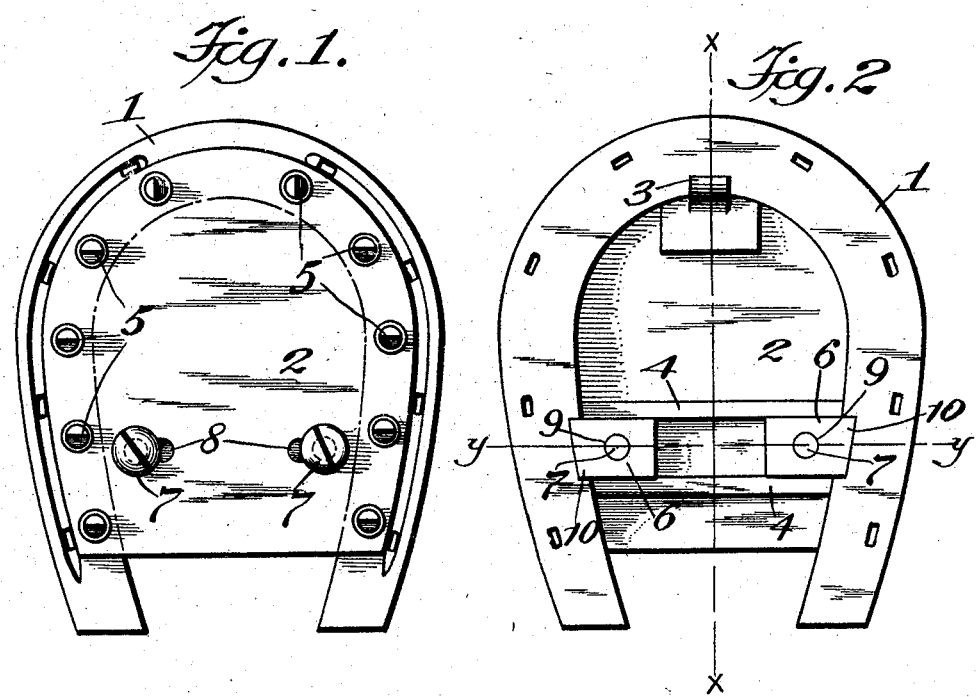
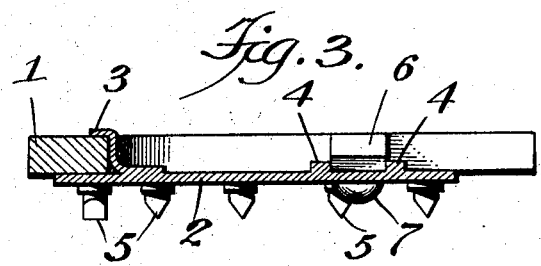
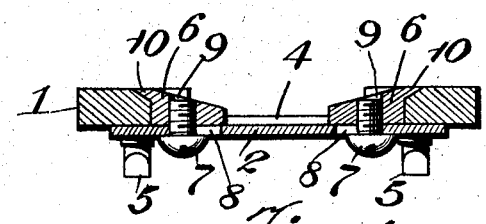
Witnesses
H. R. Appleman
William Graves
Inventor
Louis Alarme,
By his Attorney,

UNITED STATES PATENT OFFICE.

LOUIS ALARME, OF NEW YORK, N. Y.

ANTISLIPPING DEVICE FOR HORSESHOES.

No. 823,497.     Specification of Letters Patent.     Patented June 19, 1906.

Application filed April 2, 1904. Serial No. 201,250.

*To all whom it may concern:*

Be it known that I, LOUIS ALARME, a citizen of the United States, and a resident of New York, in the county and State of New York, have invented certain new and useful Improvements in Antislipping Devices for Horseshoes, of which the following is a specification.

My invention relates to antislipping devices for horseshoes.

It has for its object to provide such a device adapted to be removably attached to a horseshoe, so that when the streets are slippery by reason of being covered with snow or ice or from being wet and muddy a number of such devices may be readily attached to horses' shoes or readily removed therefrom when the condition of the streets does not require it, thereby obviating the necessity for "rough-shoeing."

It has for a further object to provide a device of the character set forth embodying advantages in point of general utility, adjustability, strength, simplicity, and inexpensiveness.

In the drawings, Figure 1 is a bottom plan view of the device applied to a horseshoe. Fig. 2 is a top plan view showing the fastening-blocks in full lines in locked position. Fig. 3 is a longitudinal sectional view taken on the line $x\,x$ of Fig. 2. Fig. 4 is a transverse sectional view taken on the line $y\,y$ of Fig. 2.

Corresponding parts in all the figures are denoted by the same reference characters.

Referring to the drawings, 1 designates a horseshoe to which my device is attached, said device comprising a plate 2, adapted to be placed against the under surface of the horseshoe and being of such size and shape as to leave the heads of the shoeing-nails uncovered.

The upper surface of the plate 2 is integrally formed with a forward lip 3, adapted to engage over the top surface of the horseshoe at the front between the shoe and the horse's hoof, and transversely-extending guides 4, and a number of sharp-pointed prongs 5 are riveted to the plate and project downwardly from its under side for the purpose of engaging the ice or the surface of the street to give the horse a good and secure foothold, and thus prevent slipping.

The plate is removably secured in place on the horseshoe by means of blocks 6, which are adjustably held between the guides 4 by means of screws 7, which project through transversely-extending elongated slots 8 in the plate 2 and engage threaded holes 9 in such blocks, said blocks having laterally-projecting lips 10, adapted to engage over the top surface of the horseshoe at the sides between the shoe and the horse's hoof when the guides are at their outer position and to be disengaged therefrom when slid to their inner position.

The operation is as follows: To attach the device to a horseshoe, the plate 2 is placed against the under surface of the shoe and slid forward until the lip 3 engages over the upper surface of the shoe at the front, the blocks 6 are slid outwardly until the lips 10 engage over the upper surface of the shoe at the sides, and the screws 7 then tightened to lock the blocks, and to detach the device it is only necessary to loosen the screws 7 and slide the blocks 6 inwardly until their lips become disengaged from the horseshoe.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variation and modification as properly fall within the scope of my invention and the terms of the following claim.

Having thus described my invention, I claim and desire to secure by Letters Patent—

An improved antislipping device for horseshoes, comprising the plate 2 adapted to fit against the under side of a horseshoe and conforming in contour thereto, the lip 3 projecting upwardly and forwardly at the front end of the plate and adapted to engage over the top surface of the horseshoe at its front, the series of prongs 5 extending around the edge of the plate and projecting downwardly from the bottom surface thereof, the guides 4 4 projecting in parallel position from the top surface of the plate and extending transversely adjacent to the rear end of the plate, the elongated slots 8 in the plate between said guides, the blocks 6 slidable upon the top surface of the plate between said guides and having the lip 10 adapted to engage over the top surface of the horseshoe near its rear ends, and the securing-screws projecting upwardly through the said slots 8 into the blocks 6 which are slidably maintained and guided between the transverse guides 4, substantially as set forth.

In testimony whereof I have signed my name in the presence of the subscribing witnesses.

LOUIS ALARME.

Witnesses:
 ROBERT W. BERNARD,
 WILLIAM GRAVES.